United States Patent
Cho et al.

(10) Patent No.: US 7,831,649 B2
(45) Date of Patent: Nov. 9, 2010

(54) METHOD FOR TRANSFORMING DATA BY LOOK-UP TABLE

(75) Inventors: Sang In Cho, Daejeon (KR); Sang Sung Choi, Daejeon (KR); Kwang Roh Park, Daejeon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 889 days.

(21) Appl. No.: 11/576,565

(22) PCT Filed: Nov. 2, 2005

(86) PCT No.: PCT/KR2005/003657

§ 371 (c)(1),
(2), (4) Date: Apr. 3, 2007

(87) PCT Pub. No.: WO2006/049419

PCT Pub. Date: May 11, 2006

(65) Prior Publication Data

US 2008/0071847 A1   Mar. 20, 2008

(30) Foreign Application Priority Data

Nov. 3, 2004   (KR) ............... 10-2004-0088765

(51) Int. Cl.
G06F 17/14   (2006.01)
(52) U.S. Cl. ........................................ 708/404
(58) Field of Classification Search .......... 708/404
See application file for complete search history.

(56) References Cited

U.S. PATENT DOCUMENTS

2008/0172436 A1 *  7/2008  Amer ............... 708/404

FOREIGN PATENT DOCUMENTS

KR   1999-0081320   11/1999
KR   2001-0064866   7/2001

* cited by examiner

Primary Examiner—Tan V Mai
(74) Attorney, Agent, or Firm—Ladas & Parry LLP

(57) ABSTRACT

Provided is a method for transforming data using a look-up table. The method includes the steps of: (a) mapping pre-processed input binary data to a constellation diagram divided into four quadrants to output a first complex number; (b) performing addition/subtraction operations between real numbers and between imaginary numbers with respect to the first complex number and a second complex number; and (c) reading a fourth complex from a look-up table in response to the first complex number, the second complex number and a third complex number, the look-up table outputting the fourth complex by performing a subtraction operation on multiplication results between real numbers and between imaginary numbers and an addition operation on multiplication results between the real numbers and the imaginary numbers with respect to the result value of the step (b) and the third complex number. Accordingly, it is possible to reduce the hardware size at the time of IFFT/FFT design and to provide a high-speed, low-power operation.

9 Claims, 4 Drawing Sheets

[Fig. 1]
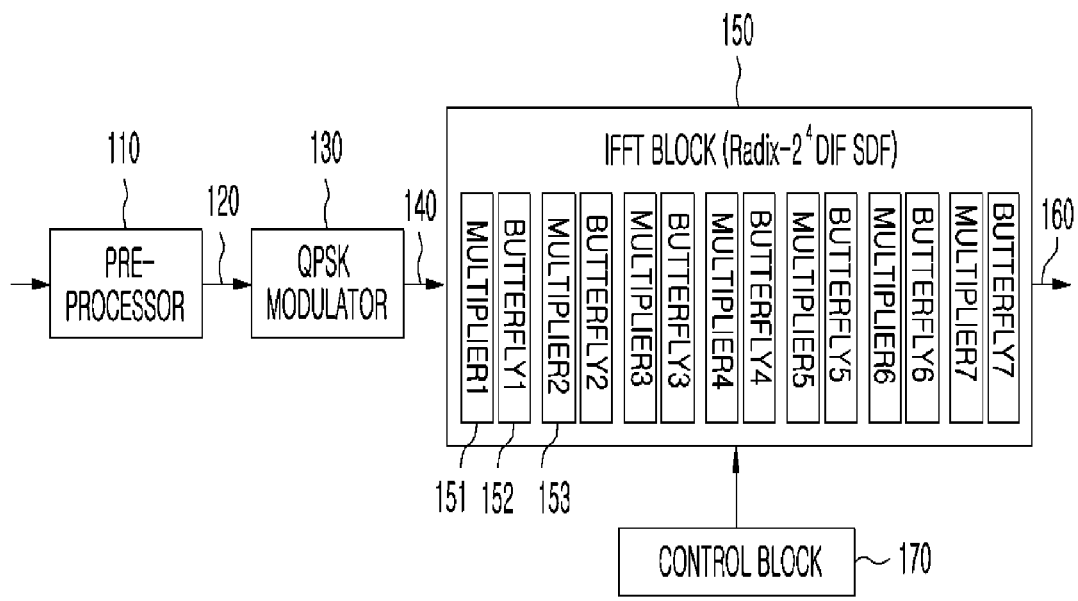
[Fig. 2]
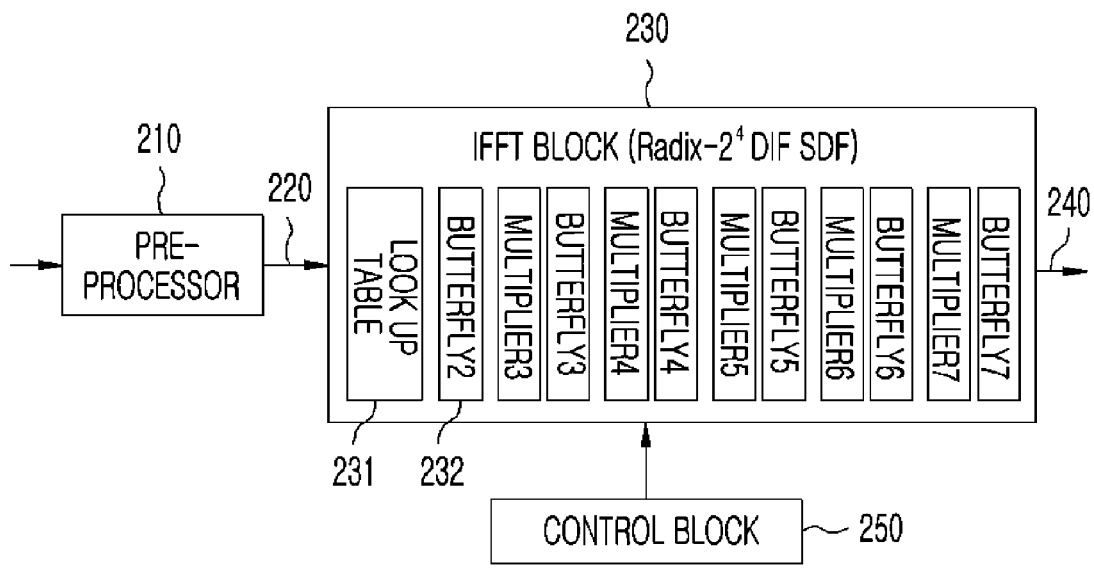

[Fig. 3]
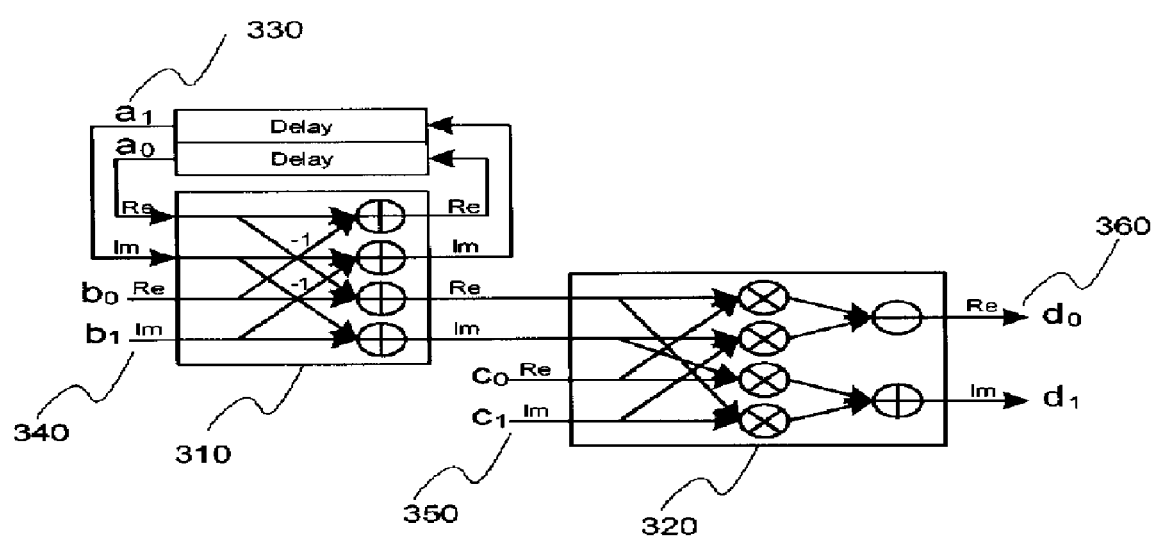

[Fig. 4]
(a)
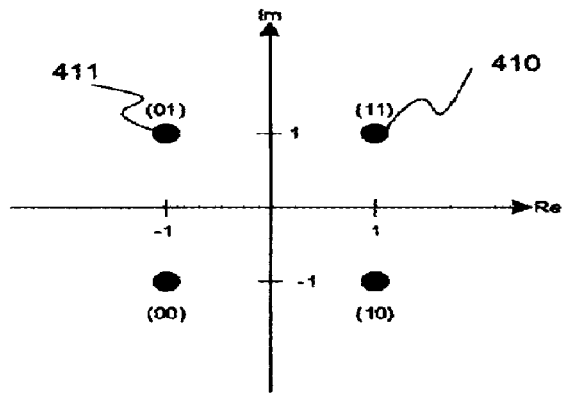
(b)
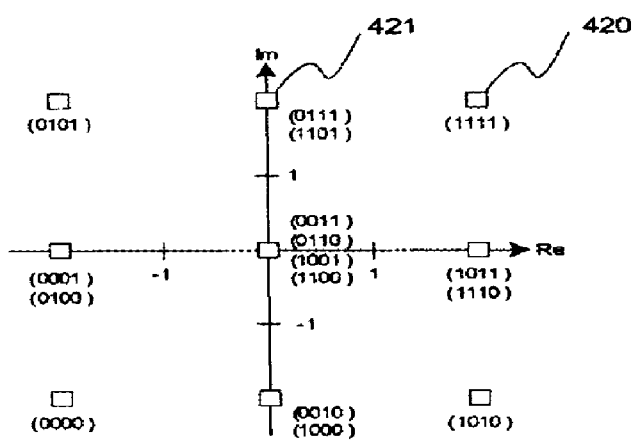
(c)
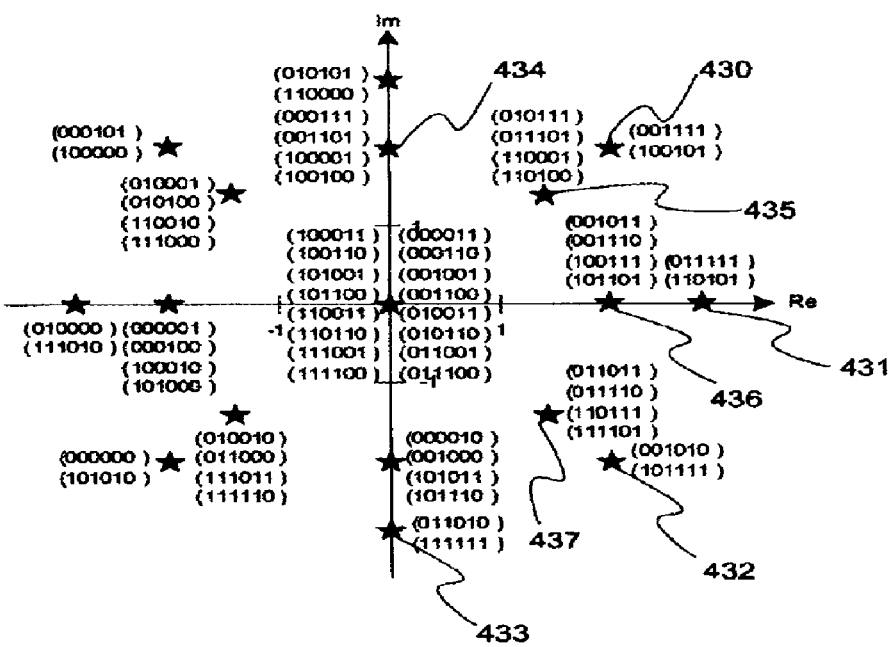

[Fig. 5]
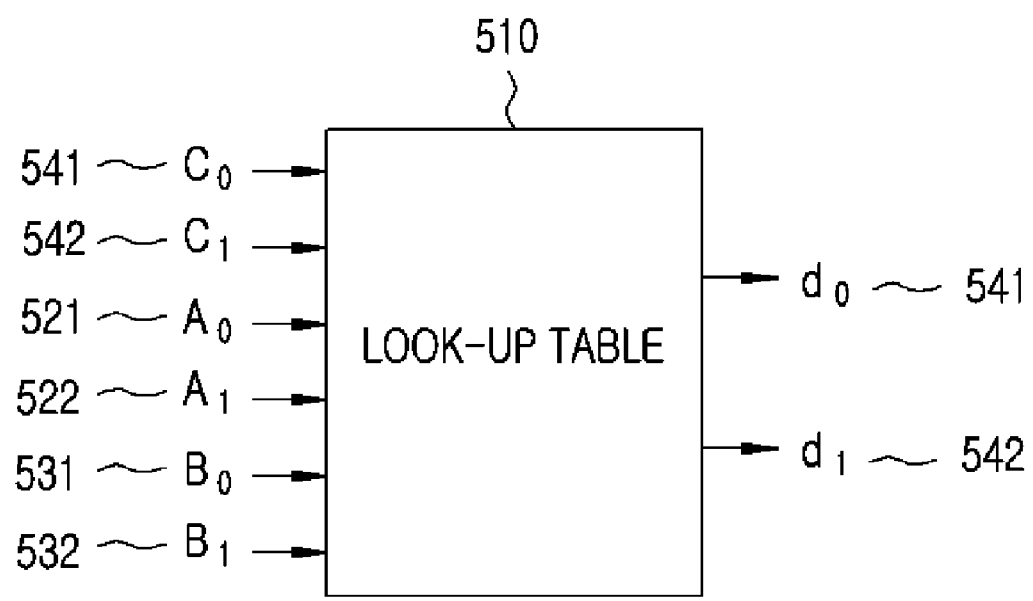

METHOD FOR TRANSFORMING DATA BY LOOK-UP TABLE

TECHNICAL FIELD

The present invention relates to a method for transforming data by a look-up table, and more particularly, to a data transforming method that uses a look-up table for design of an inverse fast Fourier transform/fast Fourier transform (IFFT/FFT) for an orthogonal frequency division multiplexing (OFDM) system and thus can provide a high-speed operation, a low-power consumption and miniturization.

BACKGROUND ART

Conventional OFDM systems have not strongly required a high-speed operation in an IFFT/FFT block. However, recent wireless communication systems requires a ultrahigh data rate of several tens to hundreds Mbps and thus must use a parallel structure or other VLSI techniques. In general, an OFDM scheme requiring an IFFT/FFT block is widely used for high-rate data transmission. The IFFT/FFT block requires a large amount of multiplication and addition and thus these arithmetic operations must be processed very rapidly.

In the OFDM scheme, high-rate data are divided into a large number of data sequences and the data sequences are simultaneously transmitted using a plurality of subcarriers. The IFFT/FFT operation is an arithmetic operation of generating subcarriers and combining data into the subcarriers. In the OFDM system, a transmitter performs an IFFT operation for combining data into subcarriers and a receiver performs an FFT operation for obtaining the data from the subcarriers. An FFT arithmetic expression is obtained from a discrete Fourier transform (DFT) expression that can be given by Equation 1 below.

$$X(k) = \sum_{n=0}^{N-1} x(n) e^{-j\frac{2\pi}{N}kn} \quad (1)$$

$$X(0) = x(0) + x(1) + x(2) + x(3) \quad (2)$$

$$X(1) = x(0) + x(1)e^{-j\frac{2\pi}{4}1} + x(2)e^{-j\frac{2\pi}{4}2} + x(3)e^{-j\frac{2\pi}{4}3}$$

$$X(2) = x(0) + x(1)e^{-j\frac{2\pi}{4}2} + x(2)e^{-j\frac{2\pi}{4}4} + x(3)e^{-j\frac{2\pi}{4}6}$$

$$X(3) = x(0) + x(1)e^{-j\frac{2\pi}{4}3} + x(2)e^{-j\frac{2\pi}{4}6} + x(3)e^{-j\frac{2\pi}{4}9}$$

In Equation 1, X(k) is the frequency-domain result from the FFT and x(n) is a time-domain input data value. In Equation 2, $$e^{-j\frac{2\pi}{N}kn}$$

is a coefficient multiplied by the input. Equation 2 expresses a 4-point DFT arithmetic operation and includes multiplications and additions. As can be seen from Equations 1 and 2, the amount of the arithmetic calculation increases as N increases.

The structure of the conventional IFFT/FFT block will now be described in detail.

FIG. 1 is a block diagram of an OFDM IFFT block including a QPSK modulator and an radix-$2^4$ DIF SDF 256-point IFFT block.

Referring to FIG. 1, the OFDM IFFT block includes a pre-processor 110, a QPSK modulator 130, an IFFT block 150, and a control block 170. The pre-processor performs convolution coding and interleaving. Binary data 120 of '1' and '0' are inputted into the QPSK modulator 130. The QPSK modulator 130 divides the inputted binary data 120 on a 2-bit basis, maps the divided data to a QPSK constellation diagram, and generates a complex output 140.

The IFFT block 150 uses an radix-$2^4$ DIF (decimation in frequency) SDF (single-path delay feedback) structure and is an 256-point IFFT block receiving 128-point complex data and 128-point '0'. The 256-point IFFT operation requires a 8-stage butterfly. However, since 128 points are constituted by '0', a butterfly of one stage can be omitted. The radix-$2^4$ structure needs a multiplier only at three stages but does not need a multiplier at the remaining stages that requires multiplication by j. A multiplier 151 performs an arithmetic operation of j and does not actually perform multiplication. A butterfly1 152 as well as the other butterflies performs addition and subtraction on two inputted complex numbers. A multiplier2 153 actually performs multiplication by three coefficients, that is, $$\left(e^{-j\frac{2\pi}{256}32}, e^{-j\frac{2\pi}{256}128}, e^{-j\frac{2\pi}{256}160}\right).$$

These multiplication coefficients are controlled by the control block 170. By the above process, the IFFT block 150 outputs a complex result 160.

As above, the QPSK modulator obtains pre-processed binary data from complex data, and the IFFT block 150 performs addition and multiplication on the complex data to output time-domain complex data.

However, since the complex data from the QPSK modulator are transformed into time-domain complex data by the IFFT block including seven butterflies and seven multipliers, the arithmetic operation speed of the IFFT/FFT is proportional to the speed of the addition and multiplication. That is, the arithmetic operation speed of the IFFT/FFT is proportional to the number of the butterflies and the multipliers.

DISCLOSURE OF INVENTION

Technical Problem

Accordingly, the present invention is directed to a data transforming method that substantially obviates one or more of the problems due to limitations and disadvantages of the related art.

An object of the present invention is to provide a data transforming method that uses inputted binary data as an address and uses a look-up table for performing addition and subtraction on two inputted complex numbers and multiplication by a coefficient selected by a control block, thereby making it possible to provide the high-speed operation, low-power consumption and miniturization of an IFFT/FFT block.

Technical Solution

To achieve these and other advantages and in accordance with the purpose of the present invention, as embodied and broadly described, there is provided a method for transforming data using a look-up table, the method including the steps of: (a) mapping pre-processed input binary data to a constellation diagram divided into four quadrants to output a first complex number; (b) performing addition/subtraction operations between real numbers and between imaginary numbers with respect to the first complex number and a second complex number; and (c) reading a fourth complex from a look-up table in response to the first complex number, the second complex number and a third complex number ($A_0, A_1, B_0, B_1, C_0, C_1$) the look-up table outputting the fourth complex ($d_0, d_1$) by performing a subtraction operation on multiplication results between real numbers and between imaginary numbers and an addition operation on multiplication results between the real numbers and the imaginary numbers with respect to the result value of the step (b) and the third complex number.

ADVANTAGEOUS EFFECTS

According to the present invention, the look-up table using the input binary data of the modulator as an address instead performs the addition/multiplication operations, thereby making it possible to reduce the hardware size at the time of the IFFT/FFT design and to provide the high-speed, low-power operation. When the look-up table is used, the QPSK modulator, an arithmetic device for −j, one butterfly, one complex multiplier a scaling block for each stage become unnecessary. This is very advantageous in view of hardware, power consumption, and operation speed. Also, a round-off error and a quantization error can be prevented from occurring at each stage, thereby enhancing the performance. The data transforming method according to the present invention can be applied to any system requiring the IFFT/FFT block, as well as the OFDM system.

BRIEF DESCRIPTION OF THE DRAWINGS

FIG. 1 is a block diagram illustrating a QPSK modulator and an Radix-$2^4$ DIF SDF 256-point IFFT block.

FIG. 2 is a block diagram of an IFFT block using a look-up table according to an embodiment of the present invention.

FIG. 3 is an operational block diagram of a butterfly and a multiplier in the IFFT block.

FIG. 4A is a constellation diagram of QPSK modulation.

FIG. 4B is a diagram illustrating the arithmetic operation results of an adder in the butterfly.

FIG. 4C is a diagram illustrating the arithmetic operation results of the multiplier.

FIG. 5 is a diagram illustrating the input and output of the look-up table.

BEST MODE FOR CARRYING OUT THE INVENTION

Hereinafter, preferred embodiments of the present invention will be described in detail with reference to accompanying drawings.

FIG. 2 is a block diagram of an OFDM IFFT block according to an embodiment of the present invention.

In the embodiment, a QPSK modulation scheme is used and a 256-point IFFT block with a radix-$2^4$ DIF SDF structure, which can be used in a multiband-OFDM (MB-OFDM) system performing a 128-point arithmetic operation, is used. The OFDM IFFT block is designed such that it performs a 256-point arithmetic operation by inserting 128 0's so as to widen a gap between repeated spectrums.

Referring to FIG. 2, the OFDM IFFT block includes a pre-processor 210, an IFFT block 230, and a control block 250. Unlike the IFFT/FFT block in FIG. 1, the OFDM IFFT block uses a look-up table 231 instead of the QPSK modulator, the multiplier1, the butterfly1 and the multiplier2, and thus performs the functions of the non-used elements by using the look-up table 231. Like reference numerals in FIGS. 1 and 2 denote like elements, and thus their description will be omitted for conciseness.

The look-up table 231 uses the input binary data of the QPSK modulator as an address, and performs the functions of the non-used butterfly and multipliers. That is, the look-up table 231 divides inputted binary data 220 on a 2-bit basis, maps the divided data to a QPSK constellation, and outputs a complex number 240. Also performed are a j arithmetic operation on the outputted complex number 240, and addition/subtraction/multiplication operations on the two inputted complex numbers.

At this time, three coefficients for the above multiplication operation are $$\left(e^{-j\frac{2\pi}{256}32}, e^{-j\frac{2\pi}{256}128}, e^{-j\frac{2\pi}{256}160}\right).$$

These multiplication coefficients are controlled by the control block 250. By the above process, complex IFFT results 240 are outputted.

FIG. 3 is an operational block diagram of the butterfly and the multiplier in the OFDM IFFT block.

Referring to FIG. 3, complex numbers $a_0+ja_1$ 330 and $b_0+jb_i$ 340 are inputted into a butterfly 310, $c_0+jc_1$ 350, which is the above multiplication coefficient, is inputted into a multiplier 320. $d_0+jd_1$ 360 is an output of a butterfly 340. Addition/subtraction operations between real numbers Re and between imaginary numbers Im are performed with respect to the complex numbers $a_0+ja_1$ 330 and $b_0+jb_i$ 340, and the resulting values are re-inputted into the butterfly 310 through a delay or outputted from the butterfly 310 to the multiplier 350. The multiplier 320 performs multiplication operations between real numbers, between imaginary numbers, and between real numbers and imaginary numbers with respect to the outputted resulting values and the complex number $c_0+jc_1$ 350, and outputs the real difference value between the multiplication results between the real numbers and between the imaginary numbers and the imaginary sum value of the multiplication results between the real numbers and the imaginary numbers.

FIG. 4A is a constellation diagram of the QPSK modulation according to the present invention.

Referring to FIG. 4A, when an input bit is '11' the output value of the QPSK modulation is 1+j1 410. On the contrary, when the input bit is '01' the output value of the QPSK modulation is −1+j1 420.

FIG. 4B is a diagram illustrating the arithmetic operation results of an adder in the butterfly.

Referring to FIG. 4B, when the input complex numbers of the butterfly are 1+j1 and 1+j1, the output complex number is 2+j2 420. In this case, the input bits 220 of the QPSK are '11' and '11' 420, respectively. On the contrary, when the input complex numbers of the butterfly are −1+j1 and 1+j1, the output complex number is 0+j2 421. In this case, the input bits 120 of the QPSK are '01' and '11' 421, respectively.

FIG. 4C is a diagram illustrating the arithmetic operation results of the multiplier. Specifically, FIG. 4C illustrates multiplication results of the arithmetic results of the butterfly and a multiplication coefficient (twiddle factor). A multiplier2 (not illustrated) in the look-up table can have three multiplication coefficients and thus can be expressed by two bits.

When a control signal of the control block 250 is '00', no value is multiplied. When the control signal of the control block 250 is '01', $$e^{-j\frac{2\pi}{256}32}$$

is multiplied. When the control signal of the control block 250 is '10

$$e^{-j\frac{2\pi}{256}128}$$

is multiplied. When the control signal of the control block 250 is '1', $$e^{-j\frac{2\pi}{256}160}$$

is multiplied. When the output value of the butterfly is 2+j2 420 and the multiplication coefficient is '1', 2+j2 430 is outputted. When the multiplication coefficient is $$e^{-j\frac{2\pi}{256}32},$$

$\frac{2}{\sqrt{2}}$

+j0 431 is outputted. When the multiplication coefficient is $$e^{-j\frac{2\pi}{256}128},$$

2−j2 432 is outputted. That is, depending on the multiplication coefficients, −j2

$\sqrt{2}$ 433,j2 434,2+j $\sqrt{2}$

435,'2'436, or j−j $\sqrt{2}$

437 is outputted.

FIG. 5 is a diagram illustrating the input and output of the look-up table. Specifically, FIG. 5 illustrates a relationship the output complex number and the input bits used as an address of the look-up table.

Referring to FIG. 5, $C_0, C_1, A_0, A_1, B_0, B_1$ are the input bits. $C_0$ 541 and $C_1$ 542 are control signals outputted from the control block 250 and are used to determine the multiplication coefficient. $A_0$ 521, $A_1$ 522, $B_0$ 531 and $B_1$ 532 are the input bits of the QPSK modulation corresponding to the input complex numbers calculated at the same time. When '$C_0 C_1 A_0 A_1 B_0 B_1$' is '100111' 436, the result value of the look-up table is 2+j0, $d_0$ 541 is 2, and $d_1$ 542 is 0. That is, since $A_0 A_1$, $B_0 B_1$ and $C_0 C_1$, are '01', '11' and '10', respectively, the butterfly arithmetic result (input: −1+j1 and 1+j1) multiplied by $$e^{-j\frac{2\pi}{256}160}$$

is outputted. At this time, since the output values d 541 and d 542 of the look-up table must be scaled for the remaining calculation, it may be beforehand scaled to a proper size at the time of the storage of it in the look-up table. The stored value in the look-up table may be any value illustrated in FIG. 4C. It may be possible to store only values of one quadrant (e.g., the first quadrant) and use a combination of a real number, an imaginary number, and a code.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

The invention claimed is:

1. A method for transforming data using a look-up table, the method comprising the steps of:
   (a) mapping pre-processed input binary data to a constellation diagram divided into four quadrants to output a first complex number;
   (b) performing addition/subtraction operations between real numbers and between imaginary numbers with respect to the first complex number and a second complex number; and
   (c) reading a fourth complex from a look-up table in response to the first complex number, the second complex number and a third complex number, the look-up table outputting the fourth complex by performing a subtraction operation on multiplication results between real numbers and between imaginary numbers and an addition operation on multiplication results between the real numbers and the imaginary numbers with respect to the result value of the step (b) and the third complex number.

2. The method of claim 1, further comprising, after the step (c), the step of outputting time-domain complex data by multiplying the result values from the look-up table at a multi-stage multiplier and alternately and sequentially performing addition/subtraction operations on input complex numbers at a multi-stage butterfly.

3. The method of claim 1, wherein a multiplication coefficient multiplied during the step (c) is one selected from the group 1, $$e^{-j\frac{2\pi}{256}32}, e^{-j\frac{2\pi}{256}128}, \text{ and } e^{-j\frac{2\pi}{256}160}$$

according to the third complex number.

4. The method of claim 3, wherein the multiplication coefficient is controlled by a control block.

5. The method of claim 1, wherein the arithmetic results of the step (b) is feedback as a parameter of the first complex number though a delay.

6. The method of claim 1, wherein the look-up table stores only a value of one quadrant among four quadrants of the output values.

7. The method of claim 1, wherein an output value of the look-up table is beforehand scaled to a predetermined size at the storage time thereof.

8. The method of claim 1, wherein the method is applied to an OFDM (orthogonal frequency division multiplexing) system.

9. The method of claim 1 or 6, wherein the method is applied to a 256-point FFT/IFFT (fast Fourier transform/inverse fast Fourier transform) operation with a radix-$2^4$ DIF (decimation in frequency) SDF (single path delay feedback) structure, which is able to be used in a multiband-OFDM system performing a 128-point arithmetic operation.

* * * * *